United States Patent
Akino et al.

(10) Patent No.: US 12,534,620 B2
(45) Date of Patent: Jan. 27, 2026

(54) ASPHALT COMPOSITION

(71) Applicant: KAO CORPORATION, Tokyo (JP)

(72) Inventors: Yusuke Akino, Wakayama (JP);
Norihiro Fukuri, Tokyo (JP); Hirotaka Kashiwagi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 674 days.

(21) Appl. No.: 17/908,606

(22) PCT Filed: Mar. 5, 2021

(86) PCT No.: PCT/JP2021/008700
§ 371 (c)(1),
(2) Date: Sep. 1, 2022

(87) PCT Pub. No.: WO2021/177445
PCT Pub. Date: Sep. 10, 2021

(65) Prior Publication Data
US 2023/0125029 A1  Apr. 20, 2023

(30) Foreign Application Priority Data
Mar. 6, 2020  (JP) .................... 2020-039316

(51) Int. Cl.
| | | |
|---|---|---|
| *C08L 95/00* | (2006.01) | |
| *C08F 36/06* | (2006.01) | |
| *C08F 212/08* | (2006.01) | |
| *C08F 220/20* | (2006.01) | |
| *C08L 23/08* | (2025.01) | |
| *C08L 23/0869* | (2025.01) | |
| *C08L 53/02* | (2006.01) | |
| *E01C 7/26* | (2006.01) | |

(52) U.S. Cl.
CPC .............. *C08L 95/00* (2013.01); *C08F 36/06* (2013.01); *C08F 212/08* (2013.01); *C08F 220/20* (2013.01); *C08L 23/0869* (2013.01); *C08L 53/02* (2013.01); *E01C 7/26* (2013.01); *C08F 2810/40* (2013.01); *C08L 2555/52* (2013.01); *C08L 2555/84* (2013.01); *C08L 2555/86* (2013.01)

(58) Field of Classification Search
CPC .......... C08L 95/00; C08L 53/02; C08L 23/08; C08F 36/06; C08F 212/08; C08F 220/20
USPC ........................................... 524/59
See application file for complete search history.

(56) References Cited

U.S. PATENT DOCUMENTS

| | | | |
|---|---|---|---|
| 4,273,685 A | | 6/1981 | Marzocchi et al. |
| 4,818,367 A | * | 4/1989 | Winkler ............... C08L 95/00 524/69 |

FOREIGN PATENT DOCUMENTS

| | | |
|---|---|---|
| GB | 2015002 A | 9/1979 |
| JP | S58-502099 A | 12/1983 |
| JP | S59-196365 A | 11/1984 |
| JP | H10-168322 A | 6/1998 |
| JP | H10-266103 A | 10/1998 |
| JP | 2002114910 A | 4/2002 |
| JP | 2004346119 A | 12/2004 |
| JP | 2006505661 A | 2/2006 |
| WO | WO-8706253 A1 | 10/1987 |
| WO | WO-2017125421 A1 * | 7/2017 ............. C08L 95/00 |

OTHER PUBLICATIONS

Highway Materials Engineering Course (HMEC), pp. 1-71. No date.*
International Search Report issued Apr. 27, 2021 in PCT/JP2021/008700 (with English translation), 7 pages.
Extended European Search Report issued Feb. 9, 2024 in European Patent Application No. 21764036.6, 6 pages.

* cited by examiner

*Primary Examiner* — Deve V Hall
(74) *Attorney, Agent, or Firm* — Element IP, PLC

(57) ABSTRACT

The present invention provides an asphalt composition obtained by blending an asphalt and an addition polymerization-type polymer, the addition polymerization-type polymer having a hydroxyl value of 10 mgKOH/g or more and 60 mgKOH/g or less and having a weight average molecular weight ($M_w$) of 2,500 or more and 70,000 or less.

16 Claims, No Drawings

ASPHALT COMPOSITION

FIELD OF THE INVENTION

The present invention relates to an asphalt composition and a method of producing the same, an asphalt mixture, an asphalt modifier, and a method of paving a road.

BACKGROUND OF THE INVENTION

An asphalt pavement using an asphalt composition has been frequently performed for paving driveways, parking spaces, cargo yards, sidewalks, etc., because of relatively easy construction and a short period of time from beginning of paving works to traffic start. The asphalt pavement includes a road surface which is formed of an asphalt mixture containing aggregates bonded with each other through asphalt, and hence, paved roads exhibit good hardness and durability.

PTL 1 (JP 2004-346119 A) discloses, for the purpose of enhancing the bonding between a floor slab and a waterproof sheet or bonding between a painted film waterproof layer and an asphalt pavement material, an asphalt composition containing an asphalt, an asphalt modifier formed of a copolymer, a petroleum resin, and a polyolefin resin at a prescribed ratio.

SUMMARY OF THE INVENTION

The present invention relates to an asphalt composition obtained by blending an asphalt and an addition-polymerization-type polymer, the addition-polymerization-type polymer having a hydroxyl value of 10 mgKOH/g or more and 60 mgKOH/g or less and having a weight average molecular weight ($M_w$) of 2,500 or more and 70,000 or less.

DETAILED DESCRIPTION OF THE INVENTION

An asphalt-paved road poor in durability deteriorates through long-term use, leading to generation of a rut of wheels. In addition, the road surface is scraped to generate abrasion dust of asphalt, resulting in generation of microplastics.

The present invention relates to an asphalt composition that can reduce the amount of microplastics generated without impairing durability of asphalt pavement.

The present invention relates to the following [1] to [6].
 [1] An asphalt composition obtained by blending an asphalt and an addition polymerization-type polymer, the addition polymerization-type polymer having a hydroxyl value of 10 mgKOH/g or more and 60 mgKOH/g or less and having a weight average molecular weight ($M_w$) of 2,500 or more and 70,000 or less.
 [2] An asphalt mixture containing the asphalt composition according to the above [1] and an aggregate.
 [3] An asphalt modifier formed of an addition polymerization-type polymer having a hydroxyl value of 10 mgKOH/g or more and 60 mgKOH/g or less and having a weight average molecular weight ($M_w$) of 2,500 or more and 70,000 or less.
 [4] A method of paving a road, the method including a step of laying the asphalt mixture according to the above [2] on a road to form an asphalt pavement material layer.
 [5] A method of producing an asphalt composition, the method including a step of mixing an asphalt and an addition polymerization-type polymer, the addition polymerization-type polymer having a hydroxyl value of 10 mgKOH/g or more and 60 mgKOH/g or less and having a weight average molecular weight ($M_w$) of 2,500 or more and 70,000 or less.
 [6] A method of producing an asphalt composition, the method including the following Step 1 and Step 2:
  Step 1: a step of producing an addition polymerization-type polymer having a hydroxyl value of 10 mgKOH/g or more and 60 mgKOH/g or less and having a weight average molecular weight ($M_w$) of 2,500 or more and 70,000 or less
  Step 2: a step of mixing an asphalt and the addition polymerization-type polymer.

According to the present invention, it is possible to provide an asphalt composition that can reduce the amount of microplastics generated without impairing durability of asphalt pavement.

[Asphalt Composition]

The asphalt composition of the present invention is an asphalt composition obtained by blending an asphalt and an addition polymerization-type polymer, the addition polymerization-type polymer having a hydroxyl value of 10 mgKOH/g or more and 60 mgKOH/g or less and having a weight average molecular weight ($M_w$) of 2,500 or more and 70,000 or less.

The present inventors have found that when a specific addition polymerization-type polymer is blended in a specific amount into an asphalt composition, the amount of microplastics generated can be reduced without impairing the durability of asphalt pavement obtained by using the asphalt composition.

A detailed mechanism of achieving the effect of the present invention is not clear, but is partially supposed as follows.

Aggregate constituting asphalt pavement is hydrophilic. On the other hand, asphalt contains a hydrophilic asphaltene component having adsorption property to aggregates and a hydrophobic maltene component not having adsorption property to aggregates. Because of low interaction between aggregate and the maltene component, the adhesiveness between aggregate and asphalt is not sufficient as a whole and a road is scraped to generate abrasion dust of asphalt, causing generation of microplastics. Conventionally, an additive that allows a compound having affinity to both the aggregate and asphalt (in particular, the maltene component) to intervene between the aggregate and asphalt to enhance the adhesiveness has been used. However, such a compound has an action to soften asphalt and the durability of asphalt pavement becomes insufficient, leading to deterioration through long-term use to cause rutting or cracking.

The addition polymerization-type polymer used in the present invention is expected to have a sufficient durability while imparting adhesiveness between asphalt and aggregate. The mechanism of this action is supposed as follows. Since the specific addition polymerization-type polymer of the present invention preferentially interacts with the maltene component to impart polarity, the adhesiveness between aggregate and asphalt can be enhanced without reducing the durability. It is considered that, by the effect, the amount of microplastics generated can be reduced without impairing durability of asphalt pavement.

[Asphalt]

The asphalt composition of the present invention is obtained by blending an asphalt.

As the asphalt, various asphalts can be used. For example, besides straight asphalt which is petroleum asphalt for pavement, a modified asphalt is exemplified. Examples of the modified asphalt include blown asphalt; and an asphalt modified with a polymer material, such as a thermoplastic elastomer or a thermoplastic resin. Straight asphalt means a residual bituminous substance obtained by treating crude petroleum with an atmospheric distillation apparatus, a vacuum distillation apparatus, or the like. Blown asphalt means an asphalt obtained by heating a mixture of straight asphalt and heavy oil, then blowing the air into the mixture to oxidize them.

The asphalt is preferably a straight asphalt or a modified asphalt from the viewpoint of the durability of asphalt pavement and the viewpoint of availability.

In this description, "asphalt" includes bitumen defined in the German industry standard DIN EN 12597. "Asphalt" and "bitumen" can be interchangeably used.

The amount of the asphalt blended in the asphalt composition is, from the viewpoint of reducing the amount of microplastics generated and the viewpoint of exhibiting asphalt performance, preferably 60% by mass or more, more preferably 70% by mass or more, further preferably 75% by mass or more, furthermore preferably 80% by mass or more, and from the viewpoint of reducing the amount of microplastics generated, is preferably 99.5% by mass or less, more preferably 99% by mass or less, further preferably 98% by mass or less.

[Asphalt Modified with Thermoplastic Elastomer]

From the viewpoint of the durability of asphalt pavement, the modified asphalt is preferably an asphalt modified with a thermoplastic elastomer, and a mixture of a straight asphalt and a thermoplastic elastomer.

As the thermoplastic elastomer, at least one selected from a styrene/butadiene block copolymer (hereinafter also referred to simply as "SB"), a styrene/butadiene/styrene block copolymer (hereinafter also referred to simply as "SBS"), a styrene/butadiene random copolymer (hereinafter also referred to simply as "SBR"), a styrene/isoprene block copolymer (hereinafter also referred to simply as "SI"), a styrene/isoprene/styrene block copolymer (hereinafter also referred to simply as "SIS"), a styrene/isoprene random copolymer (hereinafter also referred to simply as "SIR"), an ethylene/acrylic acid ester copolymer, a styrene/ethylene/butylene/styrene copolymer, a styrene/ethylene/propylene/styrene copolymer, a polyurethane-based thermoplastic elastomer, a polyolefin-based thermoplastic elastomer, an isobutylene/isoprene copolymer, polyisoprene, polychloroprene, a synthetic rubber other than the above, and a natural rubber is exemplified.

Examples of commercially available products of the ethylene/acrylic acid ester copolymer include "Elvaroy" (manufactured by DuPont de Nemours, Inc.) and "Rexpearl EEA" (manufactured by Mitsubishi Chemical Corporation).

Among them, from the viewpoint of the durability of asphalt pavement, the thermoplastic elastomer is preferably at least one selected from SB, SBS, SBR, SI, SIS, SIR, and an ethylene/acrylic acid ester copolymer, more preferably at least one selected from SB, SBS, SBR, SI, SIS, and SIR, further preferably at least one selected from SBR and SBS.

From the viewpoint of the durability of asphalt pavement, the thermoplastic elastomer has a weight average molecular weight ($M_w$) of preferably 85,000 or more, more preferably 100,000 or more, further preferably 120,000 or more, and preferably 2,000,000 or less, more preferably 1,000,000 or less, further preferably 500,000 or less, furthermore preferably 150,000 or less.

The weight average molecular weight is measured by gel permeation chromatography using polystyrenes as standard samples.

In the asphalt modified with a thermoplastic elastomer, from the viewpoint of the durability of asphalt pavement, the ratio of the thermoplastic elastomer relative to 100 parts by mass of the straight asphalt is preferably 0.1 part by mass or more, more preferably 0.5 parts by mass or more, further preferably 1 part by mass or more, furthermore preferably 2 parts by mass or more, and preferably 30 parts by mass or less, more preferably 20 parts by mass or less, further preferably 10 parts by mass or less, furthermore preferably 5 parts by mass or less.

From the viewpoint of the easiness of working of production of the asphalt composition, the asphalt modified with a thermoplastic elastomer is preferably an asphalt that is modified with a thermoplastic elastomer in advance. As the asphalt modified with a thermoplastic elastomer, a commercially available product can be used.

Asphalt modified with a thermoplastic elastomer is specified in Japan Modified Asphalt Association Standard "JMAAS-01:2019" ("Quality and Test Method of Polymer-modified Asphalt for Road Pavement"), and from the viewpoint of the durability of asphalt pavement, is preferably a modified asphalt type II or modified asphalt type III, more preferably a modified asphalt type II.

[Addition Polymerization-Type Polymer]

The asphalt composition of the present invention is obtained by blending an addition polymerization-type polymer and the addition polymerization-type polymer has a hydroxyl value of 10 mgKOH/g or more and 60 mgKOH/g or less and has a weight average molecular weight ($M_w$) of 2,500 or more and 70,000 or less.

The addition polymerization-type polymer means a polymer containing a structural unit derived from an addition-polymerizable monomer. The addition polymerization-type polymer can be produced by subjecting addition-polymerizable monomers to radical polymerization, ion polymerization, or other addition polymerization reaction.

From the viewpoint of reducing the amount of microplastics generated and the viewpoints of workability and quality stability, the addition polymerization-type polymer is preferably a polymer having a main chain constituted of a hydrocarbon group. In other words, the addition polymerization-type polymer preferably has a main chain formed only of carbon-carbon bonds, and the main chain does not contain any atom other than carbon, such as an oxygen atom, a nitrogen atom, and a sulfur atom. The "main chain" means the relatively longest bonding chain in the addition polymerization-type polymer. However, the end of the longest bonding chain of the addition polymerization-type polymer is not included in the "main chain". In other words, even when one end or both ends of the longest bonding chain are a hydroxy group, a polymer having a main chain constituted of a hydrocarbon group corresponds to the above.

The addition polymerization-type polymer is preferably a polymer constituted of a carbon atom, an oxygen atom, and a hydrogen atom, more preferably a polymer constituted only of a carbon atom, an oxygen atom, and a hydrogen atom and not containing any atom other than the above.

Examples of the addition-polymerizable monomer include a styrene compound, such as styrene, methylstyrene, α-methylstyrene, β-methylstyrene, tert-butylstyrene, chlorostyrene, chloromethylstyrene, methoxystyrene, styrenesulfonic acid or a salt thereof; (meth)acrylic acid; a (meth)acrylic acid ester, such as alkyl (meth)acrylate (for example, the number of carbon atoms of the alkyl group is 1 to 18);

an olefin, such as ethylene, propylene, or butadiene; a halovinyl compound, such as vinyl chloride; a vinyl ester, such as vinyl acetate or vinyl propionate; a vinyl ether, such as vinyl methyl ether; halogenated vinylidene, such as vinylidene chloride; and an N-vinyl compound, such as N-vinylpyrrolidone.

The addition polymerization-type polymer may be a homopolymer obtained through addition polymerization of one kind of addition-polymerizable monomers or may be a copolymer obtained through addition polymerization of two or more kinds of addition-polymerizable monomers. In the case of a copolymer, it may be any of a random copolymer, a block copolymer, and the like.

In this description, "(meth)acrylic acid" is at least one selected from acrylic acid and methacrylic acid, and "(meth)acrylate" is at least one selected from acrylate and methacrylate.

From the viewpoint of reducing the amount of microplastics generated, the addition polymerization-type polymer has a hydroxyl value of 10 mgKOH/g or more, preferably 15 mgKOH/g or more, more preferably 20 mgKOH/g or more, further preferably 25 mgKOH/g or more, and 60 mgKOH/g or less, preferably 58 mgKOH/g or less, more preferably 56 mgKOH/g or less, further preferably 55 mgKOH/g or less.

The hydroxyl value can be measured according to a method of measuring hydroxyl value described in JIS-K0070:1992.

As a method of adjusting the hydroxyl value of an addition polymerization-type polymer into a desired range, a method known to a person skilled in the art can be used. Specific examples of the method include a method in which a hydroxy group-containing monomer is used as an addition-polymerizable monomer, a method in which a structural unit derived from a vinyl ester is saponified, hydroxy group modification of a main chain, and hydroxy group modification of the end.

Examples of the hydroxy group-containing monomer include (meth)acrylic acid hydroxyalkyl esters, such as 2-hydroxyethyl (meth)acrylate and 3-hydroxypropyl (meth)acrylate.

Specific examples of the addition polymerization-type polymer include both-end-hydroxy group-incorporated polybutadiene, a styrene-hydroxyalkyl methacrylate copolymer, a polyhydroxy polyolefin, and a hydroxy group-modified styrene/butadiene/styrene block copolymer. From the viewpoint of the durability of asphalt pavement and the viewpoint of reducing the amount of microplastics generated, the addition polymerization-type polymer is preferably at least one selected from both-end hydroxy group-incorporated polybutadiene and a styrene-hydroxyalkyl methacrylate copolymer. Both-end hydroxy group-incorporated polybutadiene is preferred also from the viewpoints of the economy and workability.

From the viewpoint of the durability of asphalt pavement, the addition polymerization-type polymer has a weight average molecular weight ($M_w$) of 2,500 or more, preferably 3,000 or more, more preferably 3,500 or more, further preferably 4,000 or more, and from the viewpoint of reducing the amount of microplastics generated, 70,000 or less, preferably 50,000 or less, more preferably 30,000 or less, further preferably 25,000 or less. The addition polymerization-type polymer may have a weight average molecular weight ($M_w$) of 5,000 or more, 6,000 or more, 8,000 or more, 10,000 or more. The addition polymerization-type polymer may have a weight average molecular weight ($M_w$) of 20,000 or less, 18,000 or less, 15,000 or less.

The addition polymerization-type polymer has a weight average molecular weight ($M_w$) of preferably 2,500 or more and 50,000 or less, more preferably 3,000 or more and 30,000 or less, more preferably 3,000 or more and 50,000 or less, further preferably 5,000 or more and 50,000 or less, furthermore preferably 5,000 or more and 25,000 or less.

The weight average molecular weight is measured by gel permeation chromatography using polystyrenes as standard samples.

In the asphalt composition of the present invention, the amount of the addition polymerization-type polymer blended is, from the viewpoint of reducing the amount of microplastics generated, preferably 1 part by mass or more, more preferably 2 parts by mass or more, further preferably 3 parts by mass or more, furthermore preferably 5 parts by mass or more, and preferably 30 parts by mass or less, more preferably 28 parts by mass or less, further preferably 25 parts by mass or less, furthermore preferably 23 parts by mass or less, relative to 100 parts by mass of the asphalt.

As the addition polymerization-type polymer, a commercially available product may be used, or one synthesized by a known production method described in various patent publications and the like may be used.

In the asphalt composition of the present invention, other components, such as a softening agent, a warm mix additive, an antistripping additive, and a modifier, may be incorporated as the need arises.

[Softening Agent]

From the viewpoint of workability, the asphalt composition may contain a softening agent.

By blending a softening agent, the softness of the asphalt composition at low temperature is enhanced to enhance the workability.

An example of the softening agent is a polyolefin wax, such as polyethylene, polypropylene, or an ethylene propylene copolymer. From the viewpoint of the effect as a softening agent, the polyolefin wax is preferably a low molecular weight polyolefin wax having a weight average molecular weight of about 100 to 1,000.

The amount of the softening agent blended in the asphalt composition is, from the viewpoint of the softening action, preferably 0.1% by mass or more, more preferably 0.2% by mass or more, and from the viewpoint of the durability of asphalt pavement, preferably 2% by mass or less, more preferably less than 1% by mass.

One preferred aspect of the asphalt composition of the present invention is, from the viewpoint of the durability of asphalt pavement and the viewpoint of reducing the amount of microplastics generated, an asphalt composition obtained by blending an asphalt modified with a thermoplastic elastomer and an addition polymerization-type polymer having a hydroxyl value of 25 mgKOH/g or more and 60 mgKOH/g or less and having a weight average molecular weight ($M_w$) of 2,500 or more and 50,000 or less, the addition polymerization-type polymer being blended in an amount of 3 parts by mass or more and 25 parts by mass or less relative to 100 parts by mass of the asphalt modified with a thermoplastic elastomer.

[Other Components]

The asphalt composition of the present invention can contain a reactive monomer. An example of the reactive monomer is a monomer having one or two or more of a reactive functional group, such as a hydroxy group, a carboxy group, an epoxy group, a primary amino group, or a secondary amino group, and an addition-polymerizable group, such as a carbon-carbon unsaturated bond. The content of the reactive monomer is preferably 10% by mass or less, more preferably 5% by mass or less, further preferably 1% by mass or less. The asphalt composition of the present invention preferably contains no reactive monomer.

[Method of Producing Asphalt Composition]

The method of producing an asphalt composition of the present invention preferably includes a step of mixing an asphalt with the addition polymerization-type polymer.

Specifically, one preferred aspect of the method of producing an asphalt composition of the present invention is a method of producing an asphalt composition including a step of mixing an asphalt and an addition polymerization-type polymer, the addition polymerization-type polymer having a hydroxyl value of 10 mgKOH/g or more and 60 mgKOH/g or less and having a weight average molecular weight ($M_w$) of 2,500 or more and 70,000 or less.

Another preferred aspect of the method of producing an asphalt composition of the present invention is a method of producing an asphalt composition, the method including the following Step 1 and Step 2.

Step 1: a step of producing an addition polymerization-type polymer having a hydroxyl value of 10 mgKOH/g or more and 60 mgKOH/g or less and having a weight average molecular weight ($M_w$) of 2,500 or more and 70,000 or less Step 2: a step of mixing an asphalt and the addition polymerization-type polymer As the addition polymerization-type polymer, a commercially available product may be used, or an addition polymerization-type polymer may be synthesized by a known production method described in various patent publications.

In the step of mixing an asphalt and the addition polymerization-type polymer, preferably, an asphalt composition is obtained by melting the asphalt with heat, adding the addition polymerization-type polymer thereto, and the mixture was mixed by stirring with a generally used mixer until the components are uniformly dispersed. Examples of the generally used mixer include a homomixer, a dissolver, a paddle mixer, a ribbon mixer, a screw mixer, a planetary mixer, a vacuum reverse-flow mixer, a roll mill, and a twin screw extruder.

The temperature of mixing the asphalt and the addition polymerization-type polymer is, from the viewpoint of uniformly dispersing the addition polymerization-type polymer in the asphalt, preferably 100° C. or higher, more preferably 120° C. or higher, further preferably 140° C. or higher, furthermore preferably 150° C. or higher, and preferably 230° C. or lower, more preferably 210° C. or lower, further preferably 200° C. or lower, furthermore preferably 190° C. or lower.

From the viewpoint of efficiently uniformly dispersing the addition polymerization-type polymer in the asphalt, the time of mixing the asphalt and the addition polymerization-type polymer is preferably 0.1 hours or more, more preferably 0.5 hours or more, further preferably 1.0 hour or more, furthermore preferably 1.5 hours or more, and preferably 10 hours or less, more preferably 7 hours or less, further preferably 5 hours or less, furthermore preferably 3 hours or less.

From the viewpoint of the workability, mixing of the asphalt and the addition polymerization-type polymer is preferably performed in an open system atmosphere. The "in an open system atmosphere" means to perform in the presence of the air.

[Asphalt Mixture]

The asphalt composition of the present invention is a binder composition, and is used for pavement after an aggregate is added to the asphalt composition to produce an asphalt mixture. In other word, the asphalt composition of the present invention is suitable for pavement, in particular, for pavement of a road.

The asphalt mixture of the present invention contains the asphalt composition described above and an aggregate. That is, the asphalt mixture contains at least an asphalt, an addition polymerization-type polymer, and an aggregate.

[Aggregate]

As the aggregate, for example, any of crushed stones, cobble stones, gravel, sand, recycled aggregate, ceramic, and the like can be selected and used. As the aggregate, any of a coarse aggregate having a particle diameter of 2.36 mm or more and a fine aggregate having a particle diameter of less than 2.36 mm can be used.

Examples of the coarse aggregate include crushed stones having a particle diameter range of 2.36 mm or more and less than 4.75 mm, crushed stones having a particle diameter range of 4.75 mm or more and less than 12.5 mm, crushed stones having a particle diameter range of 12.5 mm or more and less than 19 mm, and crushed stones having a particle diameter range of 19 mm or more and less than 31.5 mm.

The fine aggregate is preferably a fine aggregate having a particle diameter of 0.075 mm or more and less than 2.36 mm. Examples of the fine aggregate include river sand, hill sand, mountain sand, sea sand, crushed stones, fine sand, screenings, crushed stone dust, silica sand, artificial sand, glass cullet, molding sand, and recycled aggregate-crushed sand.

The aforementioned particle diameter is a value prescribed in JIS A5001:2008.

Among them, a combination of the coarse aggregate and the fine aggregate is preferred.

The fine aggregate may contain a filler having a particle diameter of less than 0.075 mm (for example, sand). Examples of the filler include sand, fly ash, calcium carbonate, and hydrated lime. Among them, from the viewpoint of enhancing the dry strength, calcium carbonate is preferred.

From the viewpoint of enhancing the dry strength, the average particle diameter of the filler is preferably 0.001 mm or more, and preferably 0.05 mm or less, more preferably 0.03 mm or less, further preferably 0.02 mm or less. The average particle diameter of the filler can be measured by a laser diffraction particle size distribution analyzer. Here, the average particle diameter means an average particle diameter of 50% cumulative volume.

[Method of Measuring Average Particle Diameter of Filler]

The average particle diameter of the filler is a value measured using a laser diffraction particle size distribution analyzer (LA-950, manufactured by HORIBA, Ltd.) under the following conditions.

Measurement method: flow method
Dispersion medium: ethanol
Sample preparation: 2 mg/100 mL
Dispersing method: stirring, 1 minute under built-in ultrasonic waves From the viewpoint of the durability of asphalt pavement, a mass ratio of the coarse aggregate to the fine aggregate is preferably 10/90 or more, more preferably 20/80 or more, further preferably 30/70 or more, and preferably 90/10 or less, more preferably 80/20 or less, further preferably 70/30 or less.

Suitable examples of blending in the asphalt mixture are as follows.

(1) An example of the asphalt mixture contains, for example, 30% by volume or more and less than 45% by volume of the coarse aggregate, 30% by volume or more and 50% by volume or less of the fine aggregate, and 5% by volume or more and 10% by volume or less of the asphalt composition (fine-graded asphalt).

(2) An example of the asphalt mixture contains, for example, 45% by volume or more and less than 70% by volume of the coarse aggregate, 20% by volume or more and 45% by volume or less of the fine aggregate, and 3% by volume or more and 10% by volume or less of the asphalt composition (dense-graded asphalt).

(3) An example of the asphalt mixture contains, for example, 70% by volume or more and 80% by volume or less of the coarse aggregate, 10% by volume or more and 20% by volume or less of the fine aggregate, and 3% by volume or more and 10% by volume or less of the asphalt composition (porous asphalt).

In the asphalt mixture, other components may be further blended, as the need arises.

In a conventional asphalt mixture containing an aggregate and an asphalt, a blending proportion of the asphalt is generally adopted according to an optimum asphalt amount obtained from "Formulation and Design of Asphalt Composition" as described in "Guideline for Pavement Design and Construction" published by Japan Road Association.

In the present invention, the aforementioned optimum asphalt amount corresponds to the total amount of the asphalt and the addition polymerization-type polymer. However, the method of determining the amount is not to be limited to the method as described in "Guideline for Pavement Design and Construction", and the amount may also be determined by any other method.

[Method of Producing Asphalt Mixture]

The method of producing an asphalt mixture of the present invention includes a step of mixing a heated aggregate, an asphalt, an addition polymerization-type polymer.

Specific examples of a method of producing an asphalt mixture include conventional methods of producing an asphalt mixture called a plant mix method, a premix method, and the like. The methods are all a method in which an asphalt and an addition polymerization-type polymer are added to a heated aggregate. Examples of the addition method include a premix method in which an asphalt and an addition polymerization-type polymer are previously dissolved; and a plant mix method in which an addition polymerization-type polymer is put into an asphalt. Among them, the premix method is preferred from the viewpoint of the durability of asphalt pavement.

More specifically, in the mixing step of the method of producing an asphalt mixture, preferably (i) the asphalt is added to and mixed with the heated aggregate, and then, the addition polymerization-type polymer is added and mixed;

(ii) the asphalt and the addition polymerization-type polymer are simultaneously added to and mixed with the heated aggregate; or (iii) a mixture of the asphalt and the addition polymerization-type polymer previously mixed with heat is added to and mixed with the heated aggregate.

Among them, a method of (iii) is preferred from the viewpoint of the durability of asphalt pavement.

As the mixture of the asphalt and the addition polymerization-type polymer previously mixed with heat in the method of (iii), the asphalt composition as described above can be suitably used.

The temperature of the heated aggregate in the methods of (i) to (iii) is, from the viewpoint of the durability of asphalt pavement, preferably 130° C. or higher, more preferably 150° C. or higher, further preferably 170° C. or higher, furthermore preferably 180° C. or higher, and from the viewpoint of preventing thermal deterioration of the asphalt, preferably 230° C. or lower, more preferably 210° C. or lower, further preferably 200° C. or lower.

In the step of mixing, from the viewpoint of the durability of asphalt pavement, the temperature of mixing is preferably 130° C. or higher, more preferably 150° C. or higher, further preferably 170° C. or higher, furthermore preferably 180° C. or higher, and from the viewpoint of preventing thermal deterioration of the asphalt, preferably 230° C. or lower, more preferably 210° C. or lower, further preferably 200° C. or lower. The time of mixing in the step of mixing is not particularly limited, and is preferably 30 seconds or more, more preferably 1 minute or more, further preferably 2 minutes or more, furthermore preferably 5 minutes or more. The upper limit of the time is not particularly limited, and is preferably about 30 minutes.

From the viewpoint of the durability of asphalt pavement, the method of producing an asphalt mixture preferably includes, after the step of mixing, a step of keeping the obtained mixture at the above-mentioned temperature of mixing.

In the step of keeping, the mixture may be further mixed as long as the above-mentioned temperature or higher is kept.

In the step of keeping, the temperature of mixing is preferably 130° C. or higher, more preferably 150° C. or higher, further preferably 170° C. or higher, furthermore preferably 180° C. or higher, and from the viewpoint of preventing thermal deterioration of the asphalt composition, is preferably 230° C. or lower, more preferably 210° C. or lower, further preferably 200° C. or lower. The time of keeping in the step of keeping is preferably 0.5 hours or more, more preferably 1 hour or more, further preferably 1.5 hours or more. The upper limit of the time is not particularly limited, and is, for example, about 5 hours.

[Road Pavement Method]

The asphalt mixture of the present invention is suitable for paving a road, and as described above, an asphalt mixture in which an aggregate is added to the asphalt composition is used for paving a road.

The method of paving a road preferably includes laying the asphalt mixture on a road to form an asphalt pavement material layer. Specifically, the method of paving a road includes a step of mixing an asphalt, the above-mentioned addition polymerization-type polymer, and an aggregate to obtain an asphalt mixture (Step 1), and a step of laying the asphalt mixture obtained in the Step 1 on a road to form an asphalt pavement material layer (Step 2). The asphalt pavement material layer is generally a base course or a surface course, and from the viewpoint of reducing the amount of microplastics generated, is preferably a surface course.

The asphalt mixture may be subjected to compaction laying by such a method using a known laying machine. In the case of using a heated asphalt mixture, from the viewpoint of the durability of asphalt pavement, a compaction temperature thereof is preferably 100° C. or higher, more preferably 120° C. or higher, further preferably 130° C. or higher, and preferably 200° C. or lower, more preferably 180° C. or lower.

[Asphalt Modifier]

The asphalt modifier of the present invention is formed of an addition polymerization-type polymer having a hydroxyl value of 10 mgKOH/g or more and 60 mgKOH/g or less and having a weight average molecular weight ($M_w$) of 2,500 or more and 70,000 or less.

The asphalt modifier of the present invention can be used for obtaining an asphalt composition, for example, by being mixed with an asphalt in an amount of 1 part by mass or more and 30 parts by mass or less relative to 100 parts by mass of the asphalt. An aggregate is added to the obtained asphalt composition to produce an asphalt mixture, which can then be used for pavement. The asphalt modifier of the present invention can be suitably used as a modifier for being blended in an asphalt mixture containing an aggregate.

EXAMPLES

Property values of polymers were measured and evaluated by the following methods.
[Measurement Methods]
[Hydroxyl Value of Polymer]

A hydroxyl value of a polymer was measured on the basis of the method of JIS K0070:1992. However, only the measuring solvent was changed from the mixed solvent of ethanol and ether as prescribed in JIS K0070:1992 to a mixed solvent of acetone and toluene (acetone/toluene=1/1 (volume ratio)).
[Weight Average Molecular Weight ($M_w$) of Polymer]

According to the following method, the weight average molecular weight was determined by gel permeation chromatography (GPC).
(1) Preparation of Sample Solution A sample was dissolved in tetrahydrofuran at 40° C. at a concentration of 0.5 g/100 mL. Next, the solution was filtered through a PTFE-type membrane filter "DISMIC-25JP" having a pore size of 0.20 μm (manufactured by Toyo Roshi Kaisha, Ltd.) to remove insoluble components, thereby preparing a sample solution.
(2) Measurement of Molecular Weight Using a measurement apparatus and an analytical column described below, tetrahydrofuran as an eluent was allowed to flow at a flow rate of 1 mL/minute and the column was stabilized in a thermostatic chamber at 40° C. 100 μL of the sample solution was injected thereto to perform a measurement. The molecular weight of the sample was calculated based on a calibration curve created in advance. As the calibration curve here, one created by using several monodispersed polystyrenes (A-500 ($5.0\times10^2$), A-1000 ($1.01\times10^3$), A-2500 ($2.63\times10^3$), A-5000 ($5.97\times10^3$), F-1 ($1.02\times10^4$), F-2 ($1.81\times10^4$), F-4 ($3.97\times10^4$), F-10 ($9.64\times10^4$), F-20 ($1.90\times10^5$), F-40 ($4.27\times10^5$), F-80 ($7.06\times10^5$), and F-128 ($1.09\times10^6$) manufactured by Tosoh Corporation) as standard samples was used. Values in the parenthesis indicate the molecular weights.

Measurement apparatus: "HLC-8220 GPC" (manufactured by Tosoh Corporation)
Analytical column: "TSKgel GMHXL"+"TSKgel G3000HXL" (manufactured by Tosoh Corporation)

Production Example 1

Addition Polymerization-Type Polymer B

The interior of a three-neck flask equipped with a nitrogen introducing tube, a dewatering conduit, a stirrer, and a thermocouple was substituted with nitrogen, 300 g of xylene was put therein, and the temperature was increased to 125° C. to perform reflux. A mixture of 850 g of styrene, 150 g of 2-hydroxyethyl methacrylate, and 300 g of dibutylperoxide was added dropwise thereto with a dropping funnel over 2 hours. While keeping the temperature at 125° C., polymerization was performed for 1 hour under reflux and additional 1 hour at 160° C., and then, the solvent was removed by distillation at 200° C. under a reduced pressure over 3 hours, thereby obtaining an addition polymerization-type polymer B (styrene-hydroxyethyl methacrylate random copolymer (1)).

The addition polymerization-type polymer B had a weight average molecular weight of 5,000 and a hydroxyl value of 54 mgKOH/g.

Production Example 2

Addition Polymerization-Type Polymer C

The interior of a three-neck flask equipped with a nitrogen introducing tube, a dewatering conduit, a stirrer, and a thermocouple was substituted with nitrogen, 300 g of xylene was put therein, and the temperature was increased to 130° C. to perform reflux. A mixture of 850 g of styrene, 150 g of 2-hydroxyethyl methacrylate, and 150 g of dibutylperoxide was added dropwise thereto with a dropping funnel over 2 hours. While keeping the temperature at 130° C., polymerization was performed for 1 hour under reflux and additional 1 hour at 160° C., and then, the solvent was removed by distillation at 200° C. under a reduced pressure over 3 hours, thereby obtaining an addition polymerization-type polymer C (styrene-hydroxyethyl methacrylate random copolymer (2)).

The addition polymerization-type polymer C had a weight average molecular weight of 17,500 and a hydroxyl value of 49 mgKOH/g.

Production Example 3

Addition Polymerization-Type Polymer D

The interior of a three-neck flask equipped with a nitrogen introducing tube, a dewatering conduit, a stirrer, and a thermocouple was substituted with nitrogen, 300 g of xylene was put therein, and the temperature was increased to 135° C. to perform reflux. A mixture of 850 g of styrene, 150 g of 2-hydroxyethyl methacrylate, and 30 g of dibutylperoxide was added dropwise thereto with a dropping funnel over 2 hours. While keeping the temperature at 135° C., polymerization was performed for 1 hour under reflux and additional 1 hour at 160° C., and then, the solvent was removed by distillation at 200° C. under a reduced pressure over 3 hours, thereby obtaining an addition polymerization-type polymer D (styrene-hydroxyethyl methacrylate random copolymer (3)).

The addition polymerization-type polymer D had a weight average molecular weight of 75,000 and a hydroxyl value of 42 mgKOH/g.

Example 1

As a binder mixture, 1,000 g of a modified asphalt type II (manufactured by TOA ROAD CORPORATION) heated to 180° C. was put in a 3-L stainless steel container, and was stirred at 100 rpm, and 30 g (3 parts by mass relative to 100 parts by mass of the asphalt) of the addition polymerization-type polymer A was gradually added. The mixture was stirred at 300 rpm for 2 hours, thereby producing an asphalt composition (AS-1).

Next, 15 kg of an aggregate (the composition of the aggregate is shown below) heated to 180° C. was put in an asphalt mixer and was mixed at 180° C. for 60 seconds.

Next, 847 g of the asphalt composition (AS-1) was added thereto, and the mixture was mixed in the asphalt mixer for 2 minutes. The obtained asphalt mixture was kept at 180° C. for 2 hours, and then was filled in a mold of 300×300×50 mm. With a roller compactor (manufactured by Iwata Kogyosho K. K.), a pressure treatment of 25 rotations was applied at a temperature of 150° C. and a load of 0.44 kPa, thereby producing an asphalt mixture (M-1) as a specimen.

<Composition of Aggregate>

| | |
|---|---|
| Crushed stones No. 6 | 50.9 parts by mass |
| Crushed stones 1 | 10.4 parts by mass |
| Crushed stones 2 | 22.1 parts by mass |
| Fine sand | 10.4 parts by mass |
| Stone dust (calcium carbonate) | 6.2 parts by mass |

Passing % by Mass:

| | |
|---|---|
| Sieve opening 15 mm: | 100% by mass |
| Sieve opening 10 mm: | 85.6% by mass |
| Sieve opening 5 mm: | 49.7% by mass |
| Sieve opening 2.5 mm: | 44.6% by mass |
| Sieve opening 1.2 mm: | 31.6% by mass |
| Sieve opening 0.6 mm: | 21.3% by mass |
| Sieve opening 0.3 mm: | 12.7% by mass |
| Sieve opening 0.15 mm: | 7.1% by mass |

Examples 2 to 3

Asphalt compositions (AS-2) to (AS-3) were produced in the same manner as in Example 1 except for changing the amount of the addition polymerization-type polymer A blended to 100 g (10 parts by mass relative to 100 parts by mass of the asphalt) or 200 g (20 parts by mass relative to 100 parts by mass of the asphalt).

Asphalt mixtures (M-2) to (M-3) were obtained as a specimen in the same manner as in Example 1 except for changing 847 g of asphalt composition (AS-1) to 905 g of the asphalt composition (AS-2) or 987 g of the asphalt composition (AS-3).

Examples 4 to 5

Asphalt compositions (AS-4) to (AS-5) and asphalt mixtures (M-4) to (M-5) as a specimen were obtained in the same manner as in Example 2 except for changing the addition polymerization-type polymer A to the addition polymerization-type polymers B to C, respectively.

Example 6

An asphalt composition (AS-6) and an asphalt mixture (M-6) as a specimen were obtained in the same manner as in Example 5 except for changing the modified asphalt type II to a straight asphalt.

Comparative Example 1

An asphalt composition (AS-a1) was produced in the same manner as in Example 2 except for not blending the addition polymerization-type polymer A.

An asphalt mixture (M-a1) was obtained as a specimen in the same manner as in Example 2 except for changing 905 g of the asphalt composition (AS-2) in Example 2 to 822 g of the asphalt composition (AS-a1).

Comparative Examples 2 to 6

Asphalt compositions (AS-a2) to (AS-a6) and asphalt mixtures (M-a2) to (M-a6) as a specimen were obtained in the same manner as in Example 2 except for chancing the addition polymerization-type polymer A in Example 2 to addition polymerization-type polymers D to H, respectively.

[Evaluation]

<Measurement of Amount of Microplastics Generated>

The specimen was immersed in hot water set at 60° C. in a thermostatic chamber of 60° C., and a test was performed using a wheel tracking tester (manufactured by Iwata Kogyosho K. K.) under conditions of a load of 150 kg, a contact pressure of 0.9 MPa, a water temperature of 60° C., and a speed of 15 rpm, and the test was stopped after 1,200 rotations (80 minutes). After water was evacuated from the water tank and the interior thereof was dried, deposited abrasion dust was collected and weighed, and the obtained weight was taken as an "amount of microplastics generated". The obtained value was an amount of microplastics generated per 0.3 $m^2$, and was thus converted to a value per 100 $m^2$.

<Quantity of Rutting>

The specimen was immersed in hot water set at 60° C. in a thermostatic chamber of 60° C., and a wheel was reciprocated on the specimen using a wheel tracking tester (manufactured by Iwata Kogyosho K. K., load: 1370 N, frettage width: 47 mm, linear load: 291.5 N/cm) at a speed of 15 rpm, and the displacement after 2,500 passings was measured. Other measurement conditions were according to "B003 Wheel Tracking Test" described in "Handbook for Method of Assessment and Test for Pavement" published by Japan Road Association.

The results are shown in Table 1.

TABLE 1

| | Asphalt composition | Asphalt | Addition-polymerization-type polymer | Amount of addition-polymerization-type polymer blended (parts by mass) *1 | Properties of addition-polymerization-type polymer | |
|---|---|---|---|---|---|---|
| | | | | | Weight average molecular weight | Hydroxyl value (mgKOH/g) |
| Example 1 | AS-1 | A | A | 3 | 6,800 | 30 |
| Example 2 | AS-2 | A | A | 10 | 6,800 | 30 |
| Example 3 | AS-3 | A | A | 20 | 6,800 | 30 |
| Example 4 | AS-4 | A | B | 10 | 5,000 | 54 |
| Example 5 | AS-5 | A | C | 10 | 17,500 | 49 |
| Example 6 | AS-6 | B | C | 10 | 17,500 | 49 |
| Comparative Example 1 | AS-a1 | A | — | 0 | — | — |
| Comparative Example 2 | AS-a2 | A | D | 10 | 75,000 | 42 |
| Comparative Example 3 | AS-a3 | A | E | 10 | 7,000 | 4 |

TABLE 1-continued

| | | | | | | |
|---|---|---|---|---|---|---|
| Comparative Example 4 | AS-a4 | A | F | 10 | 2,600 | 97 |
| Comparative Example 5 | AS-a5 | A | G | 10 | 1,600 | 73 |
| Comparative Example 6 | AS-a6 | A | H | 10 | 1,700 | 46 |

| | Asphalt mixture | Amount of aggregate blended (g) | Amount of asphalt composition blended (g) | Wheel tracking test | |
|---|---|---|---|---|---|
| | | | | Amount of microplastics generated (kg/100 m$^2$) | Quantity of rutting (mm) |
| Example 1 | M-1 | 15,000 | 847 | 69 | 16 |
| Example 2 | M-2 | 15,000 | 905 | 55 | 15 |
| Example 3 | M-3 | 15,000 | 987 | 30 | 15 |
| Example 4 | M-4 | 15,000 | 905 | 54 | 16 |
| Example 5 | M-5 | 15,000 | 905 | 50 | 13 |
| Example 6 | M-6 | 15,000 | 905 | 58 | 15 |
| Comparative Example 1 | M-a1 | 15,000 | 822 | 78 | 16 |
| Comparative Example 2 | M-a2 | 15,000 | 905 | 83 | 15 |
| Comparative Example 3 | M-a3 | 15,000 | 905 | 74 | >20 |
| Comparative Example 4 | M-a4 | 15,000 | 905 | 65 | >20 |
| Comparative Example 5 | M-a5 | 15,000 | 905 | 81 | 19 |
| Comparative Example 6 | M-a6 | 15,000 | 905 | 77 | >20 |

*1: Amount of addition-polymerization-type polymer blended relative to 100 parts by mass of asphalt (parts by mass)

Asphalts and addition polymerization-type polymers used in Examples and Comparative Examples are as follows.
  (*) Asphalt A: modified asphalt type II (asphalt modified with a thermoplastic elastomer) (manufactured by TOA ROAD CORPORATION)
  (*) Asphalt B: straight asphalt (manufactured by TOA ROAD CORPORATION)
  (*) Addition polymerization-type polymer A: both-end hydroxy group-incorporated polybutadiene "G-3000" (manufactured by Nippon Soda Co., Ltd.)
  (*) Addition polymerization-type polymer B: styrene-hydroxyethyl methacrylate random copolymer (1)
  (*) Addition polymerization-type polymer C: styrene-hydroxyethyl methacrylate random copolymer (2)
  (*) Addition polymerization-type polymer D: styrene-hydroxyethyl methacrylate random copolymer (3)
  (*) Addition polymerization-type polymer E: polypropylene "Highwax NP056" (manufactured by Mitsui Chemicals, Inc.)
  (*) Addition polymerization-type polymer F: hydroxy group-modified paraffin "Paracol 6470" (manufactured by Nippon Seiro Co., Ltd.)
  (*) Addition polymerization-type polymer G: both-end hydroxy group-incorporated polybutadiene "G-1000" (manufactured by Nippon Soda Co., Ltd.)
  (*) Addition polymerization-type polymer H: end hydroxy group polyethylene glycol "Uniox M-1000" (manufactured by NOF CORPORATION)

In Comparative Example 1 in which no addition polymerization-type polymer is contained and Comparative Examples 2 to 6 in which a polymer other than a specific addition polymerization-type polymer is contained, the amount of microplastics generated cannot be sufficiently reduced and the durability of asphalt pavement is insufficient.

In contrast, it can be seen that, according to the present invention, an asphalt composition containing a prescribed amount of a specific addition polymerization-type polymer can reduce the amount of microplastics generated without impairing the durability of asphalt pavement.

The invention claimed is:
1. An asphalt composition, comprising:
an asphalt and an addition polymerization polymer, wherein
the addition polymerization polymer is a polymer having a main chain constituted of a hydrocarbon group,
the addition polymerization polymer has a hydroxyl value of 10 mgKOH/g or more and 60 mgKOH/g or less and a weight average molecular weight of 10,000 or more and 70,000 or less, and
an amount of the asphalt in the asphalt composition is 60% by mass or more.
2. The asphalt composition according to claim 1, wherein an amount of the addition polymerization polymer is 1 part by mass or more and 30 parts by mass or less relative to 100 parts by mass of the asphalt.
3. The asphalt composition according to claim 1, wherein the addition polymerization polymer is one or more selected from the group consisting of a both-end hydroxy group-incorporated polybutadiene, a styrene-hydroxyalkyl methacrylate copolymer, a polyhydroxy polyolefin, and a hydroxy group-modified styrene/butadiene/styrene block copolymer.
4. The asphalt composition according to claim 1, wherein the asphalt is a straight asphalt or a modified asphalt.
5. The asphalt composition according to claim 4, wherein the asphalt is a modified asphalt, which is an asphalt modified with a thermoplastic elastomer.
6. The asphalt composition according to claim 5, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, a styrene/isoprene random copolymer, and an ethylene/acrylic acid ester copolymer.

7. An asphalt mixture, comprising:
the asphalt composition according to claim 1 and an aggregate.

8. A method of paving a road, the method comprising:
laying the asphalt mixture according to claim 7 on a road to form an asphalt pavement material layer.

9. A method of producing the asphalt composition according to claim 1, the method comprising:
mixing the asphalt and the addition polymerization polymer.

10. The method according to claim 9, wherein the addition polymerization polymer is one or more selected from the group consisting of a both-end hydroxy group-incorporated polybutadiene, a styrene-hydroxyalkyl methacrylate copolymer, a polyhydroxy polyolefin, and a hydroxy group-modified styrene/butadiene/styrene block copolymer.

11. The asphalt mixture according to claim 7, wherein the aggregate is a combination of a coarse aggregate and a fine aggregate.

12. The asphalt mixture according to claim 11, wherein a mass ratio of the coarse aggregate to the fine aggregate is 10/90 or more and 90/10 or less.

13. The asphalt mixture according to claim 11, wherein the asphalt mixture comprises:
45% by volume or more and less than 70% by volume of the coarse aggregate,
20% by volume or more and 45% by volume or less of the fine aggregate, and
3% by volume or more and 10% by volume or less of the asphalt composition.

14. The asphalt composition according to claim 1, wherein the addition polymerization polymer contains a reactive functional group.

15. The asphalt composition according to claim 14, wherein the reactive functional group is a hydroxy group.

16. The asphalt composition according to claim 14, wherein the addition polymerization polymer is the only component containing a reactive functional group in the asphalt composition.

* * * * *